(12) United States Patent
Huang

(10) Patent No.: US 11,762,404 B2
(45) Date of Patent: Sep. 19, 2023

(54) POWER SUPPLY DEVICE HAVING VARIABLE OUTPUT VOLTAGE

(71) Applicant: FSP TECHNOLOGY INC., Taoyuan (TW)

(72) Inventor: Yaw-Chien Huang, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 29 days.

(21) Appl. No.: 17/697,975

(22) Filed: Mar. 18, 2022

(65) Prior Publication Data

US 2022/0300017 A1  Sep. 22, 2022

(30) Foreign Application Priority Data

Mar. 22, 2021 (TW) ................. 110110281

(51) Int. Cl.
*G05F 1/46* (2006.01)
*H02J 7/00* (2006.01)
*G05F 1/618* (2006.01)

(52) U.S. Cl.
CPC .............. *G05F 1/462* (2013.01); *G05F 1/618* (2013.01); *H02J 7/00308* (2020.01); *H02J 7/00712* (2020.01); *H02J 2207/20* (2020.01); *H02J 2207/40* (2020.01)

(58) Field of Classification Search
CPC ...... G05F 1/462; G05F 1/618; H02J 7/00308; H02J 7/712; H02J 2207/20; H02J 2207/40
USPC .......................................................... 323/371
See application file for complete search history.

(56) References Cited

U.S. PATENT DOCUMENTS

| | | | |
|---|---|---|---|
| 7,345,451 B2 * | 3/2008 | Chen ..................... | H02J 7/0071 320/128 |
| 9,417,643 B2 * | 8/2016 | Saint-Laurent ......... | G05F 1/468 |
| 2006/0198198 A1 * | 9/2006 | Fujita ..................... | G11C 5/147 365/185.23 |

* cited by examiner

*Primary Examiner* — Yemane Mehari
(74) *Attorney, Agent, or Firm* — WPAT, P.C

(57) ABSTRACT

A power supply device having variable output voltage includes a controller, and a first power supply module and a second power supply module connected in parallel. The controller selectively outputs a first voltage control signal and a first switch control signal to the first power supply module, or outputs a second voltage control signal and a second switch control signal to the second power supply module according to a voltage requirement signal. An output power of the first power supply module has a first voltage value selected from a first voltage value set, an output power of the second power supply module has a second voltage value selected from a second voltage value set, and a minimum value of the first voltage value set is greater than a maximum value of the second voltage value set. Thus, more extensive voltage output capabilities are provided, and good power conversion efficiency is achieved at the same time.

12 Claims, 3 Drawing Sheets

POWER SUPPLY DEVICE HAVING VARIABLE OUTPUT VOLTAGE

BACKGROUND OF THE INVENTION

Field of the Invention

The present invention relates to a power supply device, and more particularly, to a power supply device having variable output voltage.

Description of the Prior Art

With the evolving of technologies, diversified electronic products are constantly developed and launched, bringing more comprehensive functionality and convenience.

These electronic devices are extensively used, and the number of types of electronic devices, for example, cellphones, smart watches, Bluetooth earphones, tablet computers and laptop computers, used by individuals in the daily lives is also ever-increasing. These electronic devices bring people with enriched functionality as well as ease and convenience of use. However, charging voltages that these electronic devices need may be different, and corresponding chargers need to be used for charging respectively. As a result, a user is required to carry multiple chargers for theses electronic devices in response to the issue above. The use and carrying of these chargers may add a great weight, and repeated replacement of the chargers for charging different electronic devices is also troublesome. In addition, due to different voltages needed, chargers of all different kinds are produced in mass, further leading to environment protection issues in a way that such proliferation of chargers has become the object of review.

SUMMARY OF THE INVENTION

It is an object of the present invention to provide a power supply device having variable output voltage capability.

It is another object of the present invention to provide a power supply device having variable output voltage capability achieving good conversion efficiency.

It is yet another object of the present invention to provide a power supply device with a more extensive number of types of voltage outputs.

To achieve the above and other objects, a power supply device having variable output voltage provided by the present invention includes a controller, a first power supply module and a second power supply module. The controller selectively outputs a first voltage control signal and a first switch control signal or a second voltage control signal and a second switch control signal according to a voltage requirement signal. The first power supply module includes a first power conversion circuit and a first switch. The first power conversion circuit converts an input power to a first output power according to the first voltage control signal. The first switch connects the first output power to a power rail according to the first switch control signal. The second power supply module includes a second power conversion circuit and a second switch. The second power conversion circuit converts the input power to a second output power according to the second voltage control signal. The second switch connects the second output power to the power rail according to the second switch control signal. The first power supply module is connected in parallel to the second power supply module. The first output power has a corresponding first voltage value that is selected from a first voltage value set, and the second output power has a second voltage value that is selected from a second voltage value set, wherein a minimum value of the first voltage value set is greater than a maximum of the second voltage value set.

According to an embodiment of the present invention, while the voltage requirement signal is not yet transmitted to the controller, the controller may disable the first switch control signal so as to turn off the first switch and enable the second switch control signal so as to turn on the second switch.

According to an embodiment of the present invention, the voltage requirement signal has a corresponding requirement voltage value. When the requirement voltage value is the first voltage value, the controller first enables the first switch control signal so as to turn on the first switch, and then disables the second switch control signal so as to turn off the second switch.

According to an embodiment of the preset invention, the second switch has an output terminal, and the output terminal is connected to a coupling node of the power rail. A first protection unit is provided between the output terminal and the coupling node, and the first protection unit is for blocking a reverse current from the coupling node to the second power supply module.

According to an embodiment, a second protection unit may be provided between the first protection unit and the coupling node. A control terminal of the second protection unit turns on a ground path of the second protection unit according to an overvoltage protection signal provided by the controller.

According to an embodiment of the present invention, the power rail is coupled to a connection interface for electrically connecting to a load, and a third protection unit may be provided between the coupling node and the connection interface. The third protection unit includes an impedance matching circuit that adjusts an overall impedance value according to the first voltage control signal. An output terminal of the impedance matching circuit feeds back a detected voltage value on the power rail to the controller, and the controller selectively generates the overvoltage protection signal according to the detected voltage value.

According to an embodiment of the present invention, the first voltage value of the first voltage value set may be 20 V, 28 V, 36 V or 48 V.

According to an embodiment of the present invention, the second voltage value of the second voltage value set may be 5V, 9 V or 15 V.

According to an embodiment of the present invention, the first power conversion circuit may include a first power converter, a first optocoupler, a shunt regulator and a selection circuit. The selection circuit correspondingly generates a voltage selection signal according to the first voltage control signal. The shunt regulator generates a first feedback signal according to the first output power and the voltage selection signal. The first optocoupler selectively generates a first enable signal according to the first feedback signal. The first power converter generates the first output power according to the first enable signal.

According to an embodiment of the present invention, the second power conversion circuit may include a second power converter and a second optocoupler. The second optocoupler selectively generates a second enable signal according to the second voltage control signal. The second power converter generates the second output power according to the second enable signal.

According to an embodiment of the present invention, the first power converter may be a LLC resonant converter, and the second power converter may be a flyback converter.

According to an embodiment of the present invention, the controller may be a power delivery controller compliant with the Type C Universal Serial Bus (USB) specification.

Accordingly, with the two power supply modules controlled by the controller and connected in parallel, the power supply device having variable output voltage is allowed to provide the output power of any voltage value of the first voltage value set or the second voltage value set. Thus, in addition to providing more extensive voltage output capabilities, good power conversion efficiency is achieved by means of the configuration of a plurality of power supply modules.

DETAILED DESCRIPTION OF THE EMBODIMENTS

To better understand the objects, features and effects of the present invention, embodiments are given with the accompanying drawings below to further describe details of the present invention.

Singular quantitative expressions, such as "a", "an" and "one", which precede terms used hereinafter, such as units, components, apparatuses, modules, devices, circuits and signals, are not only intended to facilitate explanations but also provide general meanings to the scope of the present disclosure. Therefore, unless otherwise specified obviously, the aforesaid singular quantitative expressions must be interpreted to mean "comprises one or at least one" and include plurals.

Expressions, such as "comprise", "include", "have" and the like, used herein are not limited to essential components of the present disclosure but include any other essential components not definitely disclosed by the present disclosure, yet they are usually intrinsic to the units, components, apparatuses, modules, devices, circuits, signals, or other component usually inherent in the module.

Ordinal numbers, such as "first" and "second," used herein are intended to distinguish or correlate identical or similar units, components, apparatuses, modules, devices, circuits and/or signals and do not necessarily imply what order the units, components, apparatuses, modules, devices, circuits and/or signals are in in terms of space or time. It is understood that in some situations or arrangements the ordinal numbers may be swapped without affecting the effects of implementation of the present disclosure.

Accompanied with the thriving development of mobile and wearable electronic devices, a user may simultaneously own multiple electronic devices, and each of these electronic devices needs a corresponding charging power supply to charge batteries therein. For these electronic devices, one single power supply device can automatically provide a corresponding charging power supply based on charging requirements of individual electronic devices, bringing the user with better user experience. Such power supply device is operable according to a voltage requirement fed back from an electronic device serving as a load, and an output voltage of the electronic supply device is regulated to provide an electronic device connected thereto with a proper charging power supply.

Figure 1:
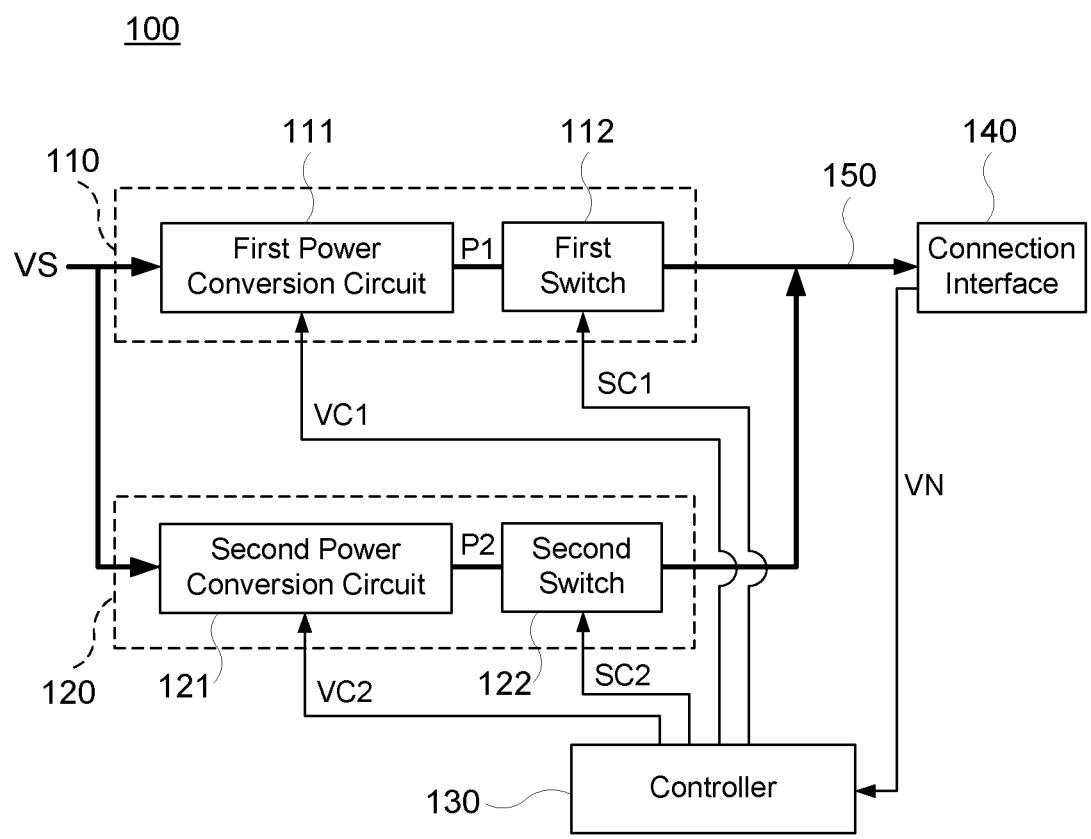
FIG. 1 is a function block diagram of a power supply device having variable output voltage according to an embodiment of the present invention.

FIG. 1 shows a function block diagram of a power supply device having variable output voltage according to an embodiment of the present invention. A power supply device 100 having variable output voltage primarily includes a first power supply module 110, a second power supply module 120 and a controller 130. An electronic device (not shown) serving as a load is connected to the power supply module 100 through a connection interface 140. The controller 130 can obtain a voltage requirement signal VN fed back by the correspondingly connected electronic device through the connection interface 140, further controlling the first power supply module 110 and the second power supply module 120.

The first power supply module 110 or the second power supply module 120 correspondingly adjusts an input power VS (for example, a mains power or another power supply) according to a control signal transmitted from the controller 130, so as to generate a power needed by the load. The first power supply module 110 and the second power supply module 120 are configured in a parallel connection in the power supply device 100; in other words, the second power supply module 120 is independent from the first power supply module 110, and the power provided by the second power supply module 120 and needed by the load is converted from the input power VS but not from a power supply converted by the first power supply module 110.

When the load is connected to the connection interface 140, the power supply device 100 may first provide a basic power to the load through the connection interface 140, so that the load can perform basic operations based on the basic power and generate the voltage requirement signal VN that is fed back to the power supply device 100. The basic power may be obtained from conversion based on the input power VS by one of the first power supply module 110 and the second power supply module 120.

The controller 130 may generate a first voltage control signal VC1 and a first switch control signal SC1 for controlling the first power supply module 110. Further, the controller 130 may generate a second voltage control signal VC2 and a second switch control signal SC2 for controlling the second power supply module 120. The controller 130 selectively generates the type of an output signal according to the voltage requirement signal VN. In this embodiment, the controller 130 outputs the first voltage control signal VC1 and the first switch control signal SC1, or outputs the second voltage control signal VC2 and the second switch control signal SC2.

The first power supply module 110 includes a first power conversion circuit 111 and a first switch 112. The first switch 112 (for example, a transistor or another electronic element) is coupled to the first power conversion circuit 111. The first power conversion circuit 111 may be enabled based on the first voltage control signal VC1, and is for converting the input power VS to a first output power P1. Moreover, the first switch 112 may be enabled based on the first switch control signal SC1, and is for activating an output channel of the power of the first power supply module 110, so that the first power P1 can be provided to a power rail 150. The power rail 150 is coupled to the connection interface 140. Accordingly, the load 200 obtains the first output power P1 through the connection interface 140. The first voltage control signal VC1 causes the first output power P1 obtained after conversion by the first power conversion circuit 111 to have a first corresponding voltage value.

On the other hand, the second power supply module 120 includes a second power conversion circuit 121 and a second switch 122. The second switch 122 (for example, a transistor or another electronic element) is coupled to the second power conversion circuit 121. The second power conversion circuit 121 may be enabled based on the second voltage control signal VC2, and is for converting the input power VS to a second output power P2. Moreover, the second switch 122 may be enabled based on the second switch control signal SC2, and is for activating an output channel of the power of the second power supply module 120, so that the second output power P2 can be provided to the power rail 150. The power rail 150 is coupled to the connection interface 140. Accordingly, the load 200 obtains the second output power P2 through the connection interface 140. The second voltage control signal VC2 causes the second output power P2 obtained after conversion by the first power conversion circuit 111 to have a second corresponding voltage value.

In this embodiment, the first power supply module 110 and the second power supply module 120 are configured to have different voltage conversion capabilities; in other words, a voltage value range of the first output power P1 that the first power supply module 110 is able to provide is different from a voltage value range of the second output power P2 that the second power supply module 120 is able to provide. For example, the first voltage corresponding to the first output source P1 may be selected from a first voltage value set, and the second voltage corresponding to the second output power P2 may be selected from a second voltage value set, wherein a minimum value of the first voltage value set is greater than a maximum value of the second voltage value set.

By configuring the power supply device by differentiation in terms of different voltage conversion capabilities, individual power supply devices are enabled to operate with better conversion efficiency. For example, the first voltage value set includes 20 V, 28 V, 36 V and 48 V, and the first voltage value is one value selected from the above; the second voltage value set includes 5 V, 9 V and 15 V, and the second voltage value is one selected from the above. The first voltage value set and the second voltage value set are respectively defined within different voltage ranges.

For the voltage conversion range of 20 V, 28 V, 36 V and 48 V above, the corresponding power supply device is preferably a resonant power supply device, for example, an inductor-inductor-capacitor (LLC) resonant converter, or a push-pull converter. On the other hand, for the voltage conversion range of 5 V, 9 V and 15 V, the corresponding power supply device is preferably a non-resonant power supply device, for example, a flyback converter, a forward converter, or a buck converter.

Moreover, for a voltage value set having a broader range, the number of power supply modules may be increased to correspond to more voltage ranges, such that the power supply devices of individual voltage ranges are operable with better conversion efficiency. For example, voltage conversion ranges 48 V, 15 V to 20 V and 5 V to 12 V are provided to a power supply module using one LLC converter, one buck converter and one flyback converter connected in parallel, accordingly specifically implementing a configuration of a power supply device with differentiation in terms of different voltage conversion capabilities. It should be noted that, similarly, the individual power supply modules connected in parallel are independent from one another, and the power that each power supply module provides to a load is obtained from converting the input power VS but is not a power obtained from conversion of any of the power supply modules.

When the electronic device serving as the load is connected to the connection interface 140, the controller 130 and the electronic device perform a handshake, so as to prompt the electronic device to transmit the voltage requirement signal VN having voltage requirement information thereof to the controller 130. Before the controller 130 receives the voltage requirement signal VN, a predetermined power supply module of the controller 130 provides a predetermined voltage. For example, before the controller 130 receives the voltage requirement signal VN, the controller 130 disables the first switch control signal SC1 to turn off the first switch 112, and enables the second switch control signal SC2 to turn on the second switch 122. The turned on second switch 122 can allow the second power supply module 120 to output the second output power P2 having a predetermined voltage. The predetermined voltage is, for example, 5V, or in another predetermined voltage value.

The predetermined voltage allows the electronic device to perform basic operations so as to be able to perform a handshake with the controller 130. When a voltage requirement value corresponding to the voltage requirement signal VN transmitted by the electronic device exceeds the voltage range that can be provided by the second power supply module 120, in terms of switch control, the controller 130 first enables the first switch control signal SC1 to turn on the first switch 112 and then disables the second switch control signal SC2 to turn off the second switch 122. For example, when the voltage requirement value corresponding to the voltage requirement signal VN is one voltage value of the first voltage value set, the controller 130 switches the power supply by the foregoing means.

Figure 2:
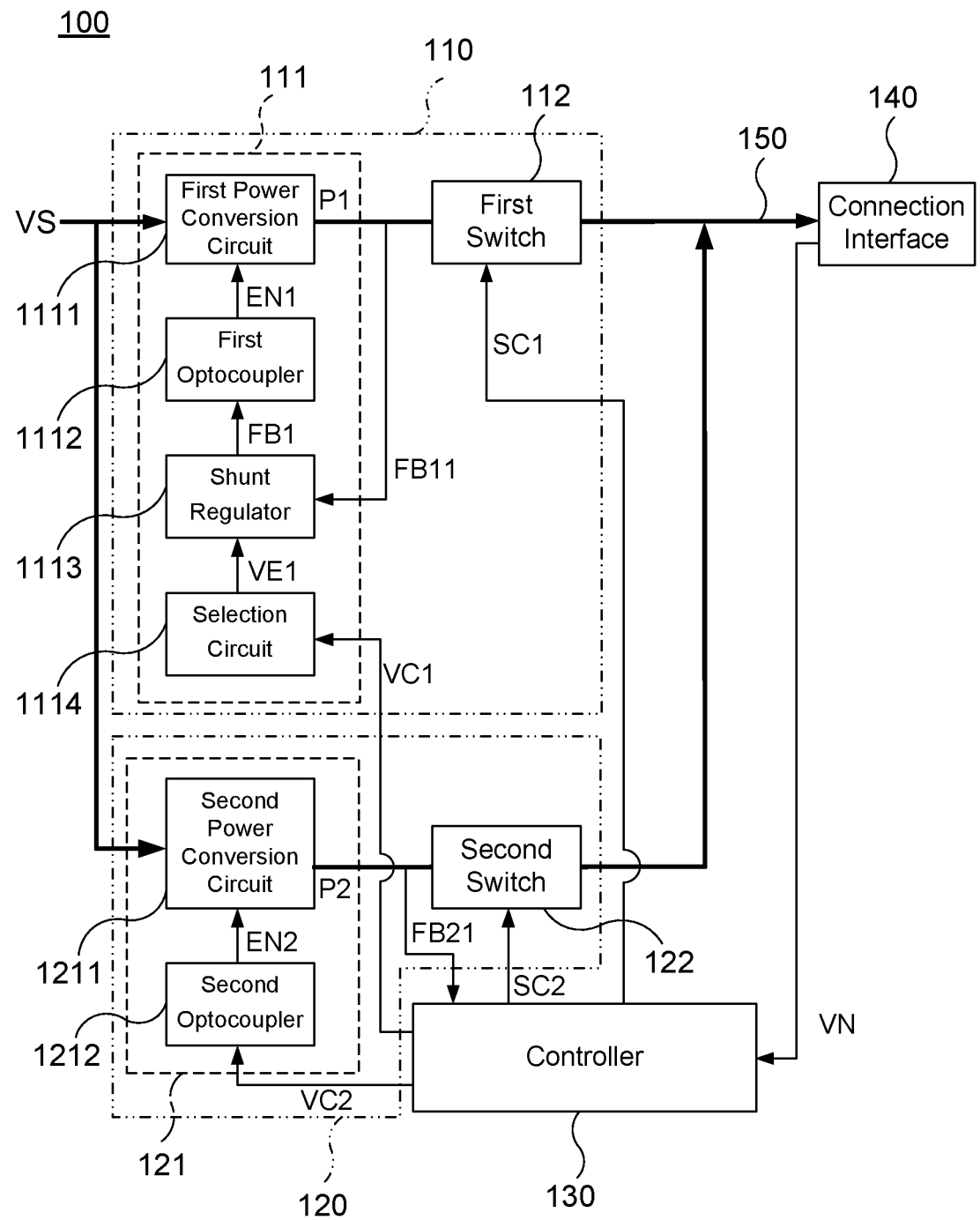
FIG. 2 is a function block diagram of a power supply device having variable output voltage according to another embodiment of the present invention.

FIG. 2 shows a function block diagram of a power supply device having variable output voltage according to another embodiment of the present invention. Each power conversion circuit includes corresponding circuit components; for example, using power conversion circuits having different power conversion characteristics, the power supply device 100 further achieves good power conversion efficiency in addition to providing capabilities of multiple voltage outputs.

In this embodiment, the first power conversion circuit 111 includes a first power converter 1111, a first optocoupler 1112, a shunt regulator 1113 and a selection circuit 1114. The second power conversion circuit 121 includes a second power converter 1211 and a second optocoupler 1212. The optocoupler 1212 is for feeding back a situation of a difference between an output voltage of a power conversion circuit and a required target voltage, and providing an isolation effect between a power converter and a control loop.

In the first power conversion circuit 111, the selection circuit 1114 correspondingly generates a voltage selection signal VE1 according to a first voltage control signal VC1 from the controller 130. For example, the selection circuit 1114 and the controller 130 perform corresponding communications through a general purpose input/output (GPIO) interface. For example, the controller 130 includes a plurality of GPIO connection interfaces correspondingly connected to the selection circuit 1114, wherein the GPIO connection interfaces respectively correspond to the same number of voltage control instructions. For example, the controller 130 includes four GPIO connection interfaces correspondingly connected to the selection circuit 1114, wherein each of the GPIO connection interfaces corresponds to a first voltage value, for example, 20 V, 28 V, 36 V or 48 V. For another example, when the controller 130 is to cause the first power conversion circuit 111 to generate a 20 V output voltage as the first output power P1, it transmits the first voltage control signal VC1 through the GPIO connection interface corresponding to 20 V. Correspondingly, the GPIO connection interface corresponding to the selection circuit 1114 receives the first voltage control signal VC1 to further generate the voltage selection signal VE1 corresponding to 20 V.

The shunt regulator 1113 serves as a voltage regulation device, and is for determining a target voltage value of the first output power P1 output by the first power converter 1111. The shunt regulator 1113 is coupled between the selection circuit 1114 and the first optocoupler 1112, and receives a divided voltage output by the first power converter 1111 and receives the voltage selection signal VE1. The shunt regulator 1113 controls the first optocoupler 1112 according to a first feedback signal FB1, so that the first optocoupler 1112 selectively generates the first enable signal EN1, further causing the first power converter 1111 to regulate the voltage value of the first output power P1 according to the first enable signal EN1.

For example, the shunt regulator 1113 may achieve a voltage regulation function by an operational amplifier and a switch element coupled to the operational amplifier. The operational amplifier compares the divided voltage of the first output power P1 and the voltage selection signal VE1, wherein the voltage selection signal VE1 is associated with voltage value information needed by the electronic device. Thus, when a voltage signal value of the divided voltage of the first output power P1 is higher than a voltage signal value of the voltage selection signal VE1, the operational amplifier sinks a first current. The first current causes a gate voltage of the switch element (for example, a transistor) to be pulled down to a voltage level lower than a threshold thereof so as to further turn off the switch element, hence keeping the rear-end first optocoupler 1112 to be turned off.

Conversely, when a voltage divided signal FB11 of the first output power P1 is lower than the voltage signal value of the voltage selection signal VE1, the operational amplifier sinks a second current lower than the first current, wherein the second current is a lower static current. The second current causes the gate voltage of the switch element to be kept at a voltage level higher than the threshold so as to turn on the switch element, such that the shunt regulator 1113 generates an output as the first feedback signal FB1. The first feedback signal FB1 is used to drive the rear-end first optocoupler 1112 to generate the first enable signal EN1.

In the second power conversion circuit 121, the second voltage control signal VC2 is for driving the second optocoupler 1212 to generate a second enable signal EN2. The second enable signal EN2 causes the second power converter 1211 to regulate the voltage value of the second output power P2. In this embodiment, the controller 130 can be configured to, for one of the power conversion circuit, for example, the second power conversion circuit 121 in this embodiment, receive a voltage divided signal FB21 of the second output power P2 output therefrom. Based on the control of the voltage requirement signal VN, when the second power conversion circuit 121 is to provide an output power, the controller 130 compares a required voltage value with the voltage divided signal FB21, so as to generate the second voltage control signal VC2 for controlling the second optocoupler 1212.

In the example in FIG. 2, the first power converter 1111 may be a LLC converter, and the second power converter 1211 may be a flyback converter. The controller 130 may be a power delivery controller compliant with the Type C Universal Serial Bus (USB) specification. Moreover, the predetermined voltage output by the controller 130 before receiving the voltage requirement signal VN is provided by the flyback converter, and for example, a 5 V voltage is provided for the electronic device to perform basic operations so as to perform a handshake with the controller 130.

Figure 3:
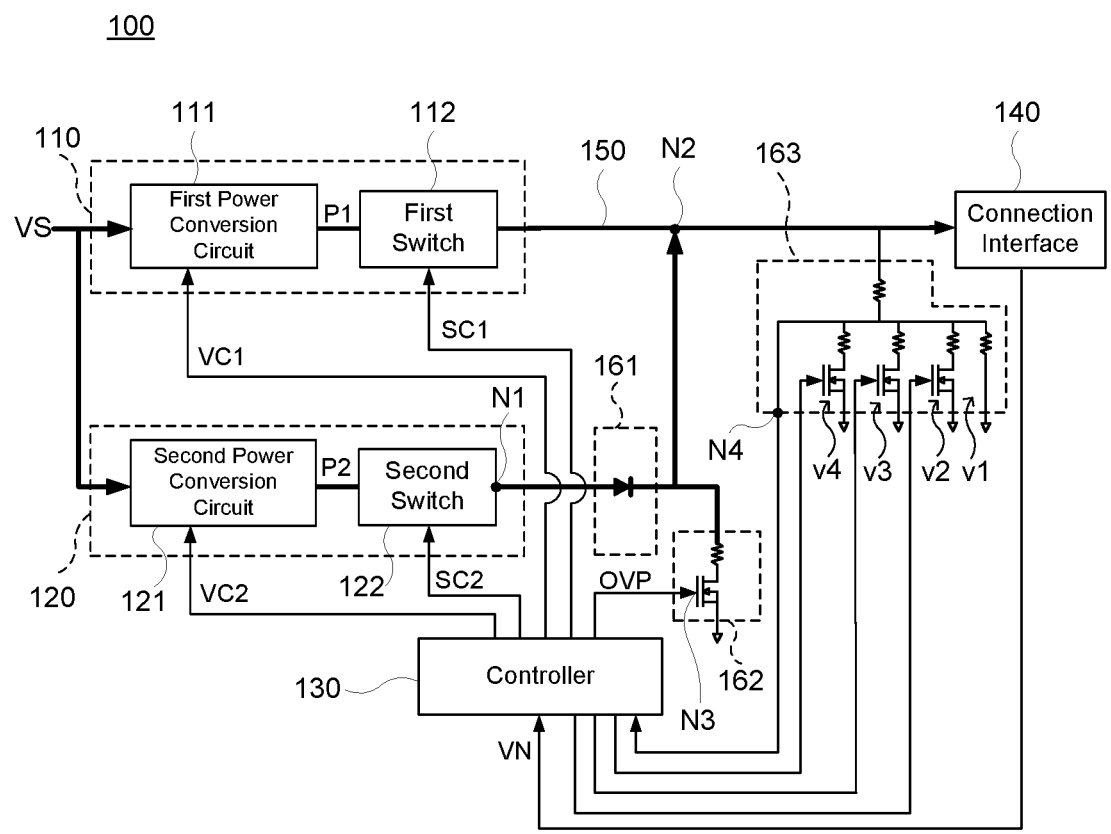
FIG. 3 is a function block diagram of a power supply device having variable output voltage according to yet another embodiment of the present invention.

FIG. 3 shows a function block diagram of a power supply device having variable output voltage according to yet another embodiment of the present invention. The embodiment in FIG. 3 further includes a first protection unit 161, a second protection unit 162 and a third protection unit 163. The protection units further provide the power supply device 100 configured with multiple power supply modules with protection, and more particularly, associated output powers of these power supply modules having voltage value ranges different from one another. The protection units 161, 162 and 163 are all configured and used in the example in FIG. 3. In other embodiments, any one or any two of these protection units may be used in other embodiments, and the example in FIG. 3 is not to be construed as a limitation.

Details of the first protection unit 161 are given below. The second switch 122 has an output terminal N1. The output terminal N1 is connected to a coupling node N2 of the power rail 150. The first protection unit 161 is provided between the output terminal N1 and the coupling node N2. The first protection unit 161 is for blocking a reverse current from the coupling node N2 to the second power supply module 120. For example, the first protection unit 161 is a diode.

Details of the second protection unit 162 are given below. The second protection unit 162 is provided between the first protection unit 161 and the coupling node N2. A control terminal N3 of the second protection unit 162 causes a ground path of the second protection unit 162 to be turned on according to an overvoltage protection signal OVP provided by the controller 130, so that the output power can be released via this ground path instead of being output into the electronic device through the connection interface 140. Since the controller 130 can obtain current voltage and current detection values (not shown) through the connection interface 140, the controller 130 can perform fundamental protective control (turning off) on the first switch 112 or the second switch 122 in the event of overvoltage. Moreover, the controller 130 can provide further protective control by configuring the second protection unit 162. The second protection unit 162 is, for example, a combination of a transistor and a resistor in FIG. 3, so as to form a switch circuit that can be connected to a ground path. The controller 130 can establish a path for controlling the second protection unit 162 through the foregoing GPIO connection interface.

Details of the third protection unit 163 are given below. The power rail 150 is coupled to the connection interface 140 for electrically connecting to an electronic device, wherein the electronic device serves as a load. The third protection unit 163 is provided and connected between the coupling node N2 and the connection interface 140. The third protection unit 163 includes an impedance matching circuit having a plurality of resistors and a plurality of transistors. The impedance matching circuit may sense a voltage value on the power rail 150 as a detected voltage value, and feed back the detected voltage value to the controller 130 through an output terminal N4.

The third protection unit 163 serves as a voltage detection circuit of the power rail 150, and at the same time, the controller 130 controls the transistors in the impedance matching circuit so that the impedance matching circuit forms a matching sensing resistance. The matching sensing resistance refers to that, when a normal power supply is provided, a current equivalent resistance of the impedance matching circuit can have the detection voltage value be substantially equal to a voltage value corresponding to the voltage requirement signal VN (that is, the controller can determine that no overvoltage occurs). Accordingly, the third protection unit 163 can be controlled to provide power supply conditions of the first power conversion circuit 111 with real-time detection, and provide a detection result (the detected voltage value) to the controller 130.

The impedance matching circuit can provide a corresponding matching sensing resistance value according to the voltage requirement signal VN. Specifically, the impedance matching circuit includes a plurality of paths v1 to v4, wherein each of the paths corresponds to a matching resistor and each of all or at least a part of the paths corresponds to a transistor. The turning on and turning off of the transistor are determined by the control of the controller 130. Further, when the transistor is turned on, the corresponding path in the impedance matching circuit is simultaneously connected, such that the corresponding resistor is on the connected path and a matching sensing resistance is automatically formed, so that voltage conditions on the power rail 150 can be correctly provided under current power supply conditions.

For another example, the third protection unit 163 is adapted to be configured in situations where the first power conversion circuit 111 is used to provide a larger voltage value set, for example, 20 V, 28 V, 36 V or 48 V. As shown in the example in FIG. 3, the impedance matching circuit includes four paths. According to the voltage requirement signal VN, the first path v1 is for providing a matching resistance combination so as to provide a correct sensing capability for 20 V (while the remaining paths v2 to v4 are disconnected) when the voltage value corresponding to the voltage requirement signal VN is 20 V.

The second path v2 is for the controller 130 to provide a signal for turning on the corresponding transistor when the voltage value corresponding to the voltage requirement signal VN is 28 V, so that the second path v2 provides a matching resistance combination (including the resistance under the first path) so as to provide a correct sensing capability for 28 V (while the remaining paths v3 and v4 are disconnected). At this point, the remaining transistors are turned off.

The third path v3 is for the controller 130 to provide a signal for turning on the corresponding transistor when the voltage value corresponding to the voltage requirement signal VN is 36V, so that the third path v3 provides a matching resistance combination (including the resistance under the first path) so as to provide a correct sensing capability for 36V (while the remaining paths v2 and v4 are disconnected). At this point, the remaining transistors are turned off.

The fourth path v4 is for the controller 130 to provide a signal for turning on the corresponding transistor when the voltage value corresponding to the voltage requirement signal VN is 48V, so that the fourth path v4 provides a matching resistance combination (including the resistance under the first path) so as to provide a correct sensing capability for 48V (while the remaining paths v2 and v3 are disconnected). At this point, the remaining transistors are turned off.

Accordingly, the third protection unit 163 can be correspondingly controlled by the controller 130, so as to provide a corresponding resistance value combination based on the voltage requirement signal VN, further performing correct voltage sensing on the power rail 150. The output terminal N4 can feed back the corresponding detected voltage value to the controller 130, for the controller 130 to use as a determination basis for whether to generate the overvoltage protection signal OVP.

When the second protection unit 162 and the third protection unit 163 are simultaneously used, there are two determination bases for the overvoltage protection signal OVP; one is the current voltage and current detection values of the output power obtained by the controller 130 through the connection interface 140, and the other is the detected voltage value that the controller 130 obtains from the output terminal N4 of the third protection unit 163. Given that any of the determination results is abnormal, the controller 130 generates the overvoltage protection signal OVP to control the second protection unit 162 so as to generate a ground path to release the abnormal voltage.

In other implementation forms, control gates of the transistors in the third protection unit 163 may be coupled to the GPIO connection interface corresponding to the controller 130. For example, since each GPIO connection interface can correspond to one first voltage value, for example, 20 V, 28 V, 36 V or 48 V, when the controller 130 transmits the corresponding voltage control instruction to the first power conversion circuit 111 through the GPIO connection interface, the voltage control instruction can be simultaneously transmitted to the corresponding transistor in the third protection unit 163. Accordingly, through the GPIO connection interface, the controller 130 can simultaneously control the first power conversion circuit 111 and the third protection unit 163.

The electronic device serving as the load above may be, for example but not limited to a device such as, a smartphone, a cellphone, a tablet computer, a laptop computer, a desktop computer, or a computer in another form.

In conclusion, the power supply device having variable output voltage disclosed by the present invention provides at least two power supply modules connected in parallel for a power rail, and allows a controller to select the corresponding power supply module according to a voltage requirement signal, thereby enabling the power supply device to provide more extensive voltage output capabilities as well as simultaneously achieving better power conversion efficiency.

While the invention has been described by way of example and in terms of the preferred embodiments, one person skilled in the art can understand that the embodiments are for explaining the present invention, but are not to be construed as limitations to the present invention. It is to be noted that, equivalent modifications and arrangements made based on the embodiments are covered within and the scope of the present invention. Therefore, the scope of the present invention should be accorded by the broadest interpretation of the appended claims of the application.

What is claimed is:

1. A power supply device having variable output voltage, comprising:
   a controller, selectively outputting a first voltage control signal and a first switch control signal or a second voltage control signal and a second switch control signal according to a voltage requirement signal;

a first power supply module, including a first power conversion circuit and a first switch, the first power conversion circuit converting an input power to a first output power according to the first voltage control signal, the first switch connecting the first output power to a power rail according to the first switch control signal; and a second power supply module, including a second power conversion circuit and a second switch, the second power conversion circuit converting the input power to a second output power according to the second voltage control signal, the second switch connecting the second output power to the power rail according to the second switch control signal;

wherein, the first power supply module is connected in parallel to the second power supply module, the first output power has a corresponding first voltage value that is selected from a first voltage value set, the second output power has a corresponding second voltage value that is selected from a second voltage value set, and a minimum value of the first voltage value set is greater than a maximum of the second voltage value set.

2. The power supply device according to claim 1, wherein while the voltage requirement signal is not yet transmitted to the controller, the controller disables the first switch control signal so as to turn off the first switch and enables the second switch control signal so as to turn on the second switch.

3. The power supply device according to claim 2, wherein the voltage requirement signal has a corresponding requirement voltage value; when the requirement voltage value is the first voltage value, the controller first enables the first switch control signal so as to turn on the first switch, and then disables the second switch control signal so as to turn off the second switch.

4. The power supply device according to claim 1, wherein the second switch has an output terminal, the output terminal is connected to a coupling node of the power rail, a first protection unit is provided between the output terminal and the coupling node, and the first protection unit is for blocking a reverse current from the coupling node to the second power supply module.

5. The power supply device according to claim 4, wherein a second protection unit is provided between the first protection unit and the coupling node, and a control terminal of the second protection unit turns on a ground path of the second protection unit according to an overvoltage protection signal provided by the controller.

6. The power supply device according to claim 5, wherein the power rail is coupled to a connection interface for electrically connecting to a load, a third protection unit is provided between the coupling node and the connection interface, the third protection unit includes an impedance matching circuit that adjusts an overall impedance value according to the first voltage control signal, an output terminal of the impedance matching circuit feeds back a detected voltage value on the power rail to the controller, and the controller selectively generates the overvoltage protection signal according to the detected voltage value.

7. The power supply device according to claim 1, wherein the first voltage value of the first voltage value set is 20 V, 28 V, 36 V or 48 V.

8. The power supply device according to claim 1, wherein the second voltage value of the second voltage value set is 5V, 9 V or 15 V.

9. The power supply device according to claim 1, wherein the first power conversion circuit has a first power converter, a first optocoupler, a shunt regulator and a selection circuit, the selection circuit generates a voltage selection signal according to the first voltage control signal, the shunt regulator generates a first feedback signal according to the first output power and the voltage selection signal, the first optocoupler selectively generates a first enable signal according to the first feedback signal, and the first power converter generates the first output power according to the first enable signal.

10. The power supply device according to claim 9, wherein the second power conversion circuit has a second power converter and a second optocoupler, the second optocoupler selectively generates a second enable signal according to the second voltage control signal, and the second power converter generates the second output power according to the second enable signal.

11. The power supply device according to claim 10, wherein the first power converter is a LLC resonant converter, and the second power converter is a flyback converter.

12. The power supply device according to claim 1, wherein the controller is a power delivery controller compliant with the Type C Universal Serial Bus (USB) specification.

* * * * *